United States Patent [19]
Aoki

[11] 3,756,525
[45] Sept. 4, 1973

[54] ENDLESS TAPE CARTRIDGE

[76] Inventor: Teiji Aoki, 23-10 Daita 2, Setagaya-ku, Tokyo, Japan

[22] Filed: Oct. 27, 1971

[21] Appl. No.: 192,987

[30] Foreign Application Priority Data

Oct. 30, 1970 Japan ............................ 45/107268
Sept. 17, 1971 Japan ............................ 46/84527

[52] U.S. Cl. ............................ 242/55.19 A, 274/4 B
[51] Int. Cl. ............................ B65h 17/48
[58] Field of Search ............................ 242/55.19 A, 197, 242/198, 199, 200, 55.19; 274/4 B, 11 B

[56] References Cited

UNITED STATES PATENTS

| | | | |
|---|---|---|---|
| 3,637,152 | 1/1972 | Okamoto | 242/55.19 A |
| 3,075,427 | 1/1963 | Salzmann | 242/55.19 A UX |
| 3,481,551 | 12/1969 | Steelman | 242/55.19 A |
| 3,489,362 | 1/1970 | Linning | 242/55.19 A |

*Primary Examiner*—Billy S. Taylor
*Attorney*—George B. Oujevolk

[57] ABSTRACT

An endless tape cartridge having a disc with a magnetic tape wound thereon, and a clamp device for clamping the disc when the cartridge is not used. The clamp device comprises an arm pivotally mounted on the cartridge at the opposite side from a reference line for inserting the cartridge in a tape player, a shoe attached to one end of the arm for engagement with the disc, a bias spring for biasing the arm to engage the shoe with the disc when the cartridge is not used, and a projection member formed on the arm for disengaging the shoe from the disc by a cartridge guide when the cartridge is used, the projection member being biased by the bias spring to project out from the cartridge when the cartridge is not used, the cartridge being pressed further to the reference line when the projection member of the arm is pushed into the cartridge.

6 Claims, 3 Drawing Figures

ENDLESS TAPE CARTRIDGE

BACKGROUND OF THE INVENTION

1. Field of the Invention

This invention relates to an endless tape cartridge.

2. Description of the Prior Art

In known endless tape cartridges the entire circumference of a flange or disc of a rotatable spool or reel on which a magnetic tape is coiled is notched for engagement with a locking member to lock the spool when the cartridges are off a tape player such as a tape recorder, so as to eliminate the possibility that, while the cartridges are carried or transported, the spool is inadvertently turned to unwind the tape coiled thereon and hence prevent smooth tape drive in the subsequent use of the cartridges.

It is desired that the spool is automatically released from its locked condition when the cartridge is placed in a tape player such as a tape recorder. In existing cartridges an unlocking member is provided in a depression formed in the front of the cartridges to receive a magnetic head of the tape player and when the cartridges are inserted in that tape player the projection is pushed by a head guide or the like in a direction opposite to that of insertion of the cartridges to release the spool from its locked condition. However, in order to provide smooth tape drive in the cartridge, it is necessary to urge the cartridge toward the capstan of the tape player by means of a spring or the like at a predetermined constant pressure. While, the above conventional method of unlocking of the spool is defective in that a force for pressing the pinch roller in the cartridge against the capstan is decreased because a force is applied to the cartridge to push it back in the direction reverse to that in which it is inserted to be placed in the tape player.

In prior small-sized cartridges the depression for receiving the magnetic head of the tape player is narrow and it is appreciably difficult to provide the unlocking member in the depression.

Further, when the endless tape cartridge is placed in the tape player the pinch roller and a head pad located at the front of the cartridge must be precisely aligned with the capstan and the head of the player. To perform this, it is necessary that the cartridge and cartridge guide of the tape player be produced with eigher right or left side of each of them as a standard.

The pinch roller of the cartridge drives a magnetic tape gripped between it and the capstan of the tape player in a known manner and the pinch roller is usually mounted in the cartridge at either right- or left-hand corner in the forward portion thereof. Namely, the magnetic tape gripped between the pinch roller and capstan is thereby driven across the head disposed opposite the head pad for recording or reproducing.

Further, in the case where the cartridge is carried or transported, especially when the amount of tape coiled on the spool is great, turning of the spool cannot be prevented with only the locking mechanism such as previously described and when the cartridge is subjected to a great torque or shock, the tape wound on the spool is caused by inertia of itself to get loose from its outer convolutions and closely contact with tape guides in the cartridge or bulge out from a pull-in slit defined between the tape guides. When the cartridge in such a condition is actually used with the tape player, the tape speed at the pull-in slit is lower than that of the tape driven by the capstan and the pinch roller, so that a large amount of tape gathers in the space of the cartridge near the pinch roller to prevent smooth winding of the tape.

Further, in the conventional endless tape cartridges the tape is withdrawn from the spool and driven in such a manner that the spool and the pinch roller are rotated in the same direction, so that the tape payed out from the pinch roller is wound on the spool while being pressed outwardly by centrifugal force and is likely to get out from the spool.

In the case where the prior endless tape cartridge of this type is vertically inserted in the tape player from above the total weight of the tape wound on the spool is placed near the tape pull-out point and an appreciably great force is required for drawing out the tape from the spool. While, the tape rewinding direction is substantially vertically upward and this introduces unstability in the tape translation.

SUMMARY OF THE INVENTION

An endless tape cartridge having a disc with a magnetic tape wound thereon, and a clamp device for clamping the disc when the cartridge is not used. In this case, the clamp device comprises an arm pivotally mounted on the cartridge at the opposite side from a reference line for inserting the cartridge in a tape player, a shoe attached to one end of the arm for engagement with the disc, a bias spring for biasing the arm to engage the shoe with the disc shen the cartridge is not used, and a projection member formed on the arm for disengaging the shoe from the disc by a cartridge guide when the cartridge is used, the projection member being biased by the bias spring to project out from the cartridge when the cartridge is not used, the cartridge being pressed further to the reference line when the projection member of the arm is pushed into the cartridge.

OBJECTS OF THE INVENTION

Accordingly, the primary object of this invention is to provide an endless tape cartridge which is free from the defects experienced in the conventional endless tape cartridge.

Another object of this invention is to provide an endless tape cartridge which is provided with unlocking means which is operable without exerting any influence on the force applied to the cartridge for inserting it in a tape player.

Another object of this invention is to provide an endless tape cartridge which is provided with means for preventing the tape from getting loose.

Still another object of this invention is to provide an endless tape cartridge which is capable of stable tape drive irrespective of the playing condition of the tape.

Other objects features and advantages of this invention will become apparent from the following description taken in conjunction with the accompanying drawings.

DESCRIPTION OF THE PREFERRED EMBODIMENTS

Figure 1:
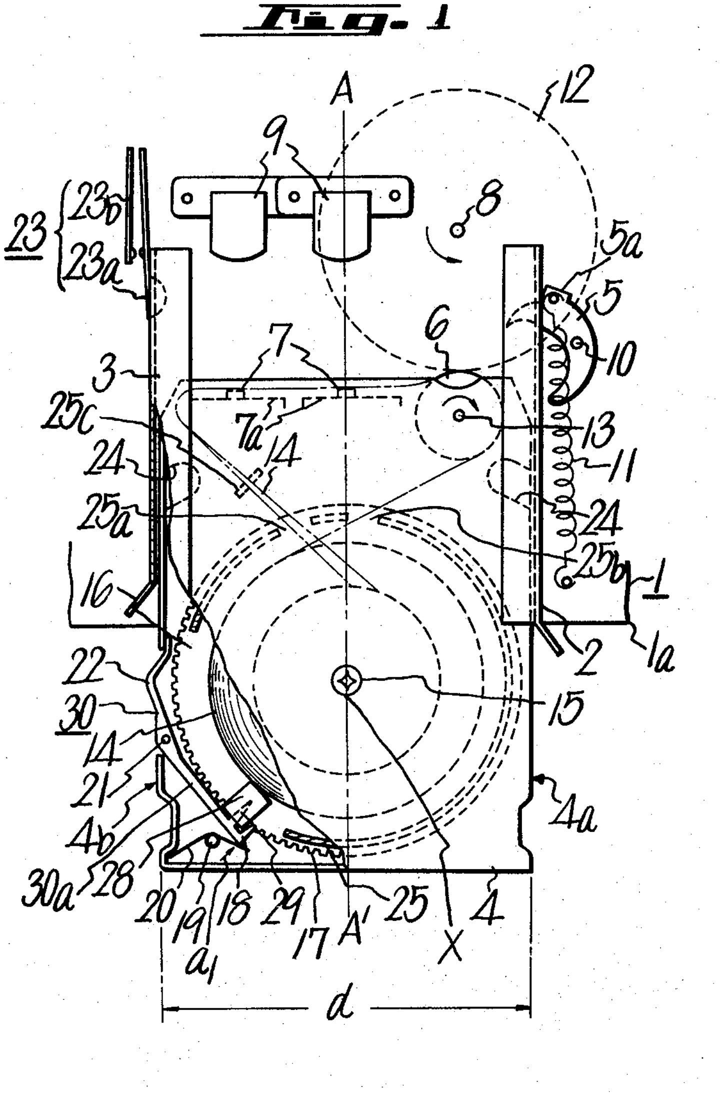
FIG. 1 is a plan view, partly in cross section, showing one example of the endless tape cartridge of this invention before completely placed in a tape player.
Figure 2:
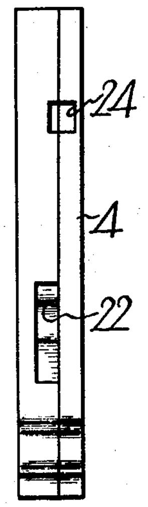
FIG. 2 is a side view of the endless tape cartridge shown in FIG. 1.

With reference to the drawings one example of this invention will hereinafter be described. In FIG. 1 reference numeral 4 indicates generally an endless tape cartridge of this invention (hereinafter referred to as a cartridge for the sake of brevity). A pinch roller 6 is mounted in the cartridge 4 on the right of a center line A—A' in a direction in which the cartridge 4 is inserted in a tape player 1. The cartridge 4 is loaded in and unloaded from the tape player 1 such as a tape recorder by means of an arch-shaped loading and unloading cam 5 mounted on a chassis 1*a* of the player 1. The chassis 1a of the player 1 has attached to both sides thereof a pair of cartridge guides 2 and 3. The distance between the cartridge guides 2 and 3 is a little greater than the width *d* of the cartridge 4 to allow the cartridge 4 to be detachably mounted on the player 1 along the center line A—A'. The cartridge 4 has mounted therein a rotary shaft 13 of the pinch roller 6 and head pads 7, 7 all of which are positioned with the right side 4a of the cartridge 4 being used as a reference plane. While, the player 1 has carried thereon a capstan 8 serving as a tape drive means and heads 9, 9 which are all positioned with the right-hand cartridge guide 2 being used as a reference. Namely, the cartridge 4 and the player 1 are designed so that when the former has been placed in the latter in such a manner that the right-side 4*a* of the cartridge 4 is in close contact with the right guide 2 of the player 1, the capstan 8 and the heads 9 may be precisely aligned with the pinch roller 6 and the head pads 7 respectively. The arch-shaped cam 5 is pivotally mounted on a shaft 10 planted on the chassis 1*a* of the player 1 and a spring 11 is fixed at one end to one end 5*a* of the cam 5 and at the other end to the chassis 1*a*. The capstan 8 has affixed thereto a flywheel 12, which is driven by a motor (not shown). The pinch roller 6 is rotatably supported by a rotary shaft 13 between top and bottom case members of the cartridge 4. The head pads 7 are secured to plate springs 7*a*, 7*a* and adapted to urge a magnetic tape 14 against the heads 9 by the biasing force of the plate springs 7*a*. The endless magnetic tape 14 is coiled on a flange 16 of a reel rotatably mounted on a shaft 15 provided in the cartridge 4. As indicated by a chain line in the figure, the magnetic tape 14 unwound from the innermost convolution of the tape coil on the reel is drawn through a slit and a support described later on and across the pads 7 and the pinch roller and then wound on the outermost convolution of the tape coil on the reel.

In the present invention, the tape 14 is drawn out from the innermost convolution of the tape coil at a position on the right of the center line A—A' of the tape coil on the flange 16 in the figure, guided to pass through a tape guide slit 25*a* on the left of the center line A—A', which guide slit 25*a* is formed in a tape guide 25 provided on, for example, the top case member of the cartridge 4 to extend along the circumference of the flange 16 for preventing the tape 14 from bulging out from the flange 16, through a tape support 25*c* provided in the cartridge 4, between the heads 9 and the head pads 7, between the pinch roller 6 and the capstan 8 and through a tape guide slit 25*b* of the tape guide 25 on the right of the center line A—A' and then rewound on the outer periphery of the tape coil on the left of the center line A—A'. In other words, the tape 14 is driven with its off-running and in-coming runs crossing each other at one point. Accordingly, the off-running position of the tape 14 does not change even if the cartridge 4 is loaded in the tape player 1 in a vertical position from above and the total weight of the tape coiled on the flange 16 is placed on a point X on the shaft 15 lying on the center line A—A'. In the present invention a tape clamp 30 is provided, namely its arm 30*a* is pivotally mounted on a pin 21 planted on the bottom case member of the cartridge 4 on the left of the flange 16 in the figure, its arm 30*a* carrying a click-like shoe 18 at one free end (the lower end in the figure) thereof. While, notches 17 are formed in the circumference of the flange 16 and a spring 20 is mounted on a pin 19 provided in the cartridge 4. The arm 30*a* of the tape clamp 30 is biased by the spring 20 as indicated by an arrow $a_1$ to engage the shoe 18 with the notch 17 to prevent turning of the spool at inoperated condition.

In this invention the arm 30*a* of the tape clamp 30 has a clamp releasing projection 22 on the opposite side from the shoe 18. While the spool is clamped by the shoe 18, the projection 22 projects outwardly of the cartridge 4, that is, projects further to left from the side wall 4b in the figure. Reference numeral 28 designates a tape pad, which is mounted on the arm 30*a* on the side of the shoe 18 with respect to the pin 21 of the arm 30*a*. Accordingly, while the shoe 18 remains in engagement with the circumferential notch 17 of the flange 16 to clamp it, the tape pad 28 is in contact with the outer periphery of the tape 14 coiled on the flange 16 to prevent unwinding of the tape 14. When the shoe 18 is disengaged from the notch 17 the shoe 28 is also moved out of contact with the tape 14.

The tape pad 28 may be disposed closer to the pin 21 than the free end of the arm 30*a* carrying the shoe 18 or farther therefrom than the tip of the latter. The tape pad 28 is mounted as by manual pressing on a spike-, rod-, screw- or like support 29 planted at a predetermined position on the arm 30*a* toward the flange 16. Accordingly, the tape pad 28 can be easily removed from the support 29. The tape pad 28 is formed of an elastic material such as rubber, plastic, foamed plastic or the like and the length of the tape pad 28 can be adjusted by replacement with another pad of a suitable length in accordance with the amount of the tape 14 coiled on the flange 16. Although the clamp 30 is shown to consist of the click-like shoe 18 formed on the arm 30*a* and the notches 17 formed in the periphery of the flange 16, it may also be formed such that the flange 16 is not notched and that rubber, felt or like material capable of making frictional contact with the smooth periphery of the flange 16 is pasted to the arm 30*a* of the clamp 30 as the shoe 18.

Reference numeral 24 designates depressions respectively formed in the both sides 4*a* and 4*b* of the cartridge 4 for engagement with one end of the cam 5. In the figure the left cam 5 is omitted for the same of simplicity.

Figure 3:
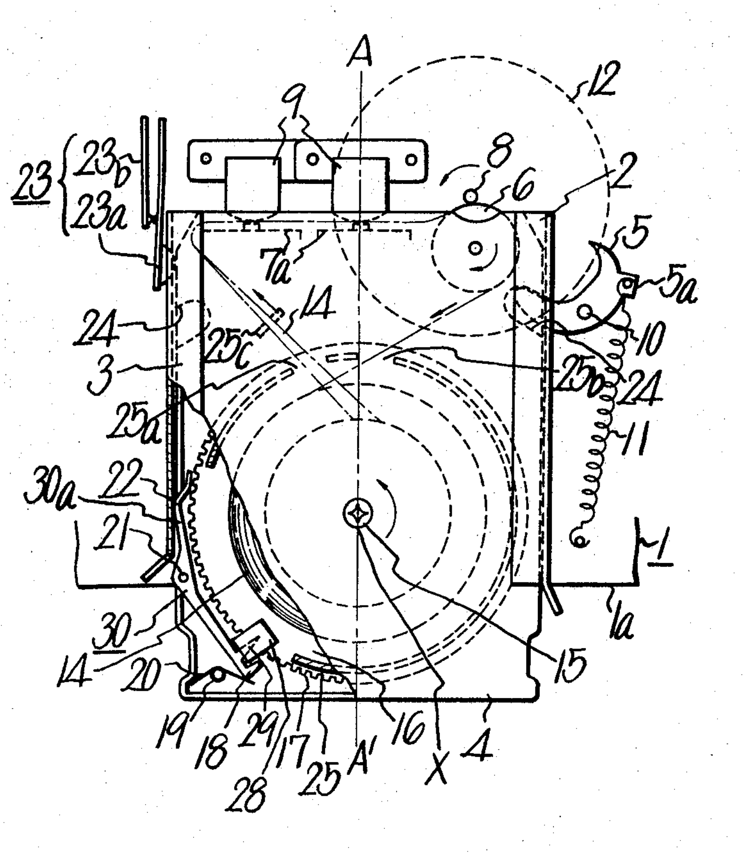
FIG. 3 is a plan view, partly in cross section, showing the endless tape cartridge in the condition completely placed in the tape player.

Pushing further in the tape player 1 the cartridge 4 of such a condition as shown in FIG. 1 in which the cartridge 4 is still in its inoperative condition, that is, the clamp 30 still clamps the flange 16, the tip of the right side 4a of the cartridge 4 pushes the one tip of the cam 5 to turn it. When the point of attachment of the spring 11 to the cam 5 goes across the extension of a line joining the pin 10 with the point of attachment of the spring 11 to the chassis 1*a*, the cam 5 continues to turn due to the force of the spring 11 to bring the other tip of the cam 5 into engagement with the depression 24 formed in the right side 4*a* of the cartridge 4 to lock the cartridge 4. At this time, the pinch roller 6 is urged against the capstan 8 with the tape 14 gripped therebetween. This is illustrated in FIG. 3. In this case, the clamp releasing projection 22 which projects to left from the left side 4*b* of the cartridge 4 while the cartridge 4 is in its inoperative condition, is pushed by the left guide 3 on the chassis 1*a* inwardly of the left side 4*b* of the cartridge 4 with the forward sliding movement of the cartridge 4. Accordingly, the shoe 18 mounted on the lower end ot the arm 30*a* of the clamp 30 is brought out of contact with the circumferential notches 17 of the flange 16 against the pressure of the spring 20 to allow free rotation of the flange 16. In this case, the tape pad 28 is also disengaged from the outermost convolution of the tape coil on the flange 16. Further, at this time, the left projecting portion of the arm 30*a* of the clamp 30 is pushed to right by the left tape guide 3 of the chassis 1 *a*, so that the cartridge 4 is also pushed to right. Consequently, the cartridge 4 is inserted in the player 1 with the right side 4*a* of the former being urged against the right guide 2 of the latter which was employed as the reference plane in the manufacture of the cartridge. Thus, the pinch roller 6 and the head pads 7 are brought into correct alignment with the capstan 8 and the heads 9 respectively with the tape 14 being gripped therebetween. In this case, substantially no force is produced which tends to bring out the cartridge 4 from its operative position.

In the case of requiring a switch 23 of the player 1 which is turned on by the insertion of the cartridge 4 thereinto, the switch 23 is disposed such that the free end portion of the one resilient contact piece 23*a* of the switch 23 usually lies further to right from the left cartridge guide 3, that is, on the side of the center line A—A'. With such an arrangement, when the cartridge 4 is inserted in the player, the contact piece 23*a* is pushed by the cartridge 4 into contact with the other contact piece 23*b* to turn on the switch 23 (refer to FIG. 3) and, at the same time, the resilient contact piece 23*a* presses, due to its restoring force, the cartridge 4 toward the reference plane, that is, to right in the figure, further ensuring to retain the cartridge 4 in its operative position.

By suitably selecting the shape of the cam 5, the position of its pin 10 and the shape of the depressions in the side of the cartridge 4, too, the cartridge 4 can be pushed forward with its right side 4*a* in close contact with the reference plane, that is, the right cartridge guide 2 of the player 1.

With the present invention above described, the clamp releasing projection 22 is provided on the opposite side from the pinch roller 6 with respect to the center line A—A' of the cartridge 4, so that even in the case of a miniaturized cartridge, tape clamp can be automatically released with ease only by loading the cartridge in the player and, at the same time, the cartridge is pressed against the reference plane of the player and thereby held correctly in position.

Further, this invention eliminates the possibility that while the cartridge is carried or transported, the magnetic tape wound on the reel gets loose to hinder smooth unwinding of the tape when the cartridge will be subsequently used.

It will be apparent that many modifications and variations may be effected without departing from the scope of the novel concepts of this invention.

I claim as my invention

1. An endless tape assembled cartridge, comprising in combination:

a. a substantially rectangular cartridge casing defined by front and rear walls connected by opposed sidewalls (4) with a disc therein having wound thereon a magnetic tape, said disc axis being substantially on the centerline of said cartridge casing with respect to the direction of inserting said substantially rectangular cartridge casing into a tape player;

b. a pinch roller (6) towards one corner of said casing (4) away from said centerline, said corner being one of the two corners first inserted into a tape player;

c. a clamp means (30) for clamping the disc while the cartridge is not used towards the diagonally opposite corner of said casing (4) said clamp means (30) including an arm (30a) pivotally mounted in the housing;

d. shoe means (18) provided at one end of said arm (30*a*) for engagement with the disc, bias means (20) disposed in the casing (4) for causing the shoe means to engage the disc to clamp the disc while the cartridge is not used; and, e. a releasing projecting member (22) formed on the arm (30*a*) which projects out from the side wall of the casing furtherest from the pinch roller (4) when the cartridge is not inserted into a tape player said releasing projecting member (22) when pressed into said casing (4) causing said arm (30*a*) to pivot and act against said bias means (20) to disengage the shoe means (18) from the disc, said projecting member (22) being caused by the bias means (20) to project out from the casing when the cartridge is not used, the projecting member (22) being pushed into the casing (4) by guide means (2, 3) of the tape player, when the cartridge is inserted in the tape player.

2. An endless tape cartridge as claimed in claim 1, which further includes a tape guide for preventing the tape wound on the disc from getting out therefrom, the tape guide being provided in the form of a ring on a top case member of the cartridge casing to conform to the periphery of the disc.

3. An endless tape cartridge as claimed in claim 2, wherein the tape guide has a tape pull-in and pull-out slits and the magnetic tape wound on the disc is drawn out from the innermost convolution of the tape coil and guided to pass through the tape pull-out slit of the tape guide, across magnetic heads of the tape player and through the pull-in slit and then rewound on the outermost convolution of the tape coil.

4. An endless tape cartridge as claimed in claim 3, wherein the tape pull-out slit and the tape pull-in slit are on opposite sides of the casing and the tape coiled on the disc crosses itself while extending from the innermost convolution of the tape coil to the outermost convolution thereof.

5. An endless tape cartridge as claimed in claim 4, wherein a tape support is provided at one side of the cartridge casing to support the tape drawn out through the tape pull-out slit of the tape guide.

6. An endless tape cartridge as claimed in claim 1, wherein the arm of the clamp means has tape pad means engaged with the tape for preventing the magnetic tape wound on the disc from getting loose while the cartridge is not used, the tape pad means disengaging from the tape when the clamp means is released.

* * * * *